(12) United States Patent
Tecu et al.

(10) Patent No.: US 11,859,968 B2
(45) Date of Patent: Jan. 2, 2024

(54) MEASURING TAPE WITH PRESET LENGTH

(71) Applicants: Kirk Steven Tecu, Longmont, CO (US); Duncan Doyle, Denver, CO (US); Sean Michael Shiers, Mead, CO (US)

(72) Inventors: Kirk Steven Tecu, Longmont, CO (US); Duncan Doyle, Denver, CO (US); Sean Michael Shiers, Mead, CO (US)

( * ) Notice: Subject to any disclaimer, the term of this patent is extended or adjusted under 35 U.S.C. 154(b) by 192 days.

(21) Appl. No.: 17/511,878

(22) Filed: Oct. 27, 2021

(65) Prior Publication Data

US 2022/0390220 A1 Dec. 8, 2022

Related U.S. Application Data

(60) Provisional application No. 63/197,831, filed on Jun. 7, 2021.

(51) Int. Cl.
| | |
|---|---|
| *G01B 3/10* | (2020.01) |
| *G01B 3/1007* | (2020.01) |
| *G01B 3/1069* | (2020.01) |
| *G01D 7/12* | (2006.01) |
| *G01D 5/347* | (2006.01) |
| *G01B 3/1005* | (2020.01) |

(52) U.S. Cl.
CPC ......... *G01B 3/1007* (2020.01); *G01B 3/1069* (2020.01); *G01D 5/3473* (2013.01); *G01D 7/12* (2013.01); *G01B 2003/1015* (2013.01); *G01B 2003/1028* (2013.01); *G01B 2210/58* (2013.01)

(58) Field of Classification Search
CPC ....... G01B 3/1061; G01B 3/1069; G01D 7/12
USPC .......................... 33/1 PT, 707, 756, 762, 763
See application file for complete search history.

(56) References Cited

U.S. PATENT DOCUMENTS

| | | | | | |
|---|---|---|---|---|---|
| 4,181,848 | A | * | 1/1980 | Iwase .................. | G06F 15/0275 33/763 |
| 4,181,959 | A | * | 1/1980 | Tateishi ............... | G01B 3/1061 33/760 |
| 4,181,960 | A | * | 1/1980 | Tateishi ............... | G01B 3/1084 377/53 |
| 4,195,348 | A | * | 3/1980 | Kakutani ............. | G01B 3/1084 33/763 |
| 4,242,574 | A | * | 12/1980 | Grant .................. | G01B 3/1061 33/763 |
| 4,483,077 | A | * | 11/1984 | Matsumoto ............ | G01B 11/02 116/202 |
| 4,551,847 | A | * | 11/1985 | Caldwell ................ | G01D 5/363 377/24 |

(Continued)

*Primary Examiner* — George B Bennett

(57) ABSTRACT

When extending the leader or tape from a traditional tape measure over a large distance, a user situated away from the body of the tape measure is unable to determine the length that has been extended at the leading edge. Presented herein is a retractable measuring device in which the body of the measuring device is configured to compute and broadcast the amount of tape that has been withdrawn from the body to a receiver. The receiver may be located at the leading edge of the tape or comprise a secondary device such as a smartphone. Alternatively, the broadcast may include tactile, audible, or visual feedback relating to the distance that may be received directly by the user. Additionally, the retractable device may include an interface for setting a desired length and provide either the user or receiver with feedback when the desired length has been reached.

12 Claims, 9 Drawing Sheets

(56) References Cited

U.S. PATENT DOCUMENTS

| | | | | |
|---|---|---|---|---|
| 4,642,899 | A * | 2/1987 | Fass | G01B 3/1084 33/763 |
| 4,747,215 | A * | 5/1988 | Waikas | G01B 7/026 33/763 |
| 5,027,526 | A * | 7/1991 | Crane | A43D 1/027 33/763 |
| 5,208,767 | A * | 5/1993 | George-Kelso | G01B 11/02 33/763 |
| 5,286,972 | A * | 2/1994 | Falk | G01B 3/11 33/763 |
| 5,345,691 | A * | 9/1994 | Falk | G01B 11/043 43/25 |
| 5,426,863 | A * | 6/1995 | Biggel | G01B 3/1061 33/763 |
| 5,433,014 | A * | 7/1995 | Falk | G01D 5/347 455/67.11 |
| 5,983,514 | A * | 11/1999 | Lindsey | G01B 3/1061 33/760 |
| 6,658,755 | B2 * | 12/2003 | Arlinsky | G01B 3/1041 33/763 |
| 6,971,185 | B2 * | 12/2005 | Scarborough | G01B 3/1084 33/761 |
| 7,363,723 | B1 * | 4/2008 | Peterson | G01B 3/1084 33/760 |
| 7,401,416 | B2 * | 7/2008 | Brooks | G01B 3/1084 33/630 |
| 8,739,426 | B1 * | 6/2014 | Freed | G01B 3/10 33/763 |
| 9,774,986 | B2 * | 9/2017 | Hoge | H04W 4/80 |
| 10,859,363 | B2 * | 12/2020 | Murray | G01D 5/262 |
| 11,092,417 | B1 * | 8/2021 | Luckey | G01B 3/1003 |
| 11,199,391 | B2 * | 12/2021 | Wang | G01B 3/1061 |
| 11,536,552 | B1 * | 12/2022 | Luckey | G01B 3/1069 |
| 2014/0250708 | A1 * | 9/2014 | Bauer | G01B 3/1061 33/760 |
| 2015/0308807 | A1 * | 10/2015 | Rhoden | G01B 3/1061 33/763 |
| 2022/0307810 | A1 * | 9/2022 | Fuji | G01B 3/1094 |

* cited by examiner

US 11,859,968 B2

MEASURING TAPE WITH PRESET LENGTH

CROSS-REFERENCE TO RELATED APPLICATION

This application claims the benefit of U.S. Provisional Application No. 63/197,831, filed Jun. 7, 2021.

TECHNICAL FIELD

This disclosure is related to the hardware and tool industry and specifically to retractable measuring and marking devices.

BACKGROUND OF THE DISCLOSURE

When making measurements and especially when those measurements are over a large distance such as a field or construction site, a user may wish to anchor the body in a fixed location, and pull the tape by the leader until the desired length is reached. As the tape dimensions are traditionally shown at the body of tape exit location, this method of measuring is not possible with one person. Currently, the user must first hold the body of the tape measure, second, extract the tape with the leading tip of the tape moving away from them until user reaches the desired distance, third, set the body of the tape down, and finally walk out to position the leader.

Presented herein is a retractable measuring device, such as a tape measure or chalk line, which includes a user interface at the body (and potentially at the leading edge of the tape) allowing the user to preset the target length, extend the tape or string until the desired length is reached, and have the tape alert or stop the tape at the target length as the user pulls out the tape from the body.

Several novel ideas which are improvements over the existing devices are presented in detail including a measuring device with an audible/visible alert system, a leading tip display in communication with the body, braking mechanisms in the body, a wireless interface which can communicate with a receiving unit such as a smart phone, and an electronic compass/GPS which aids in positioning the lead.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure but are intended to be illustrative only.

FIG. 1 shows an isometric view of a retractable measuring tape having a user interface corresponding to an embodiment of the present disclosure.

FIG. 2 shows a constructed view of a retractable measuring tape assembly corresponding to an embodiment of the present disclosure.

FIG. 3 shows an exploded view of a retractable measuring tape corresponding to an embodiment of the present disclosure.

FIG. 4 shows a system block diagram of interacting components to facilitate a retractable measuring tape corresponding to an embodiment of the present disclosure.

FIG. 5 shows a detailed view of a remote user interface in communication with the main body of the retractable measuring tape corresponding to an embodiment of the present disclosure.

FIGS. 6A and 6B show mating points for charging the remote interface from the main body corresponding to an embodiment of the present disclosure.

FIG. 7 shows a bottom view of the mating points positioned on the remote user interface and the main body corresponding to an embodiment of the present disclosure.

FIGS. 8A and 8B show a right-hand and left-hand adaptable display corresponding to an embodiment of the present disclosure.

FIG. 9 shows a man-machine interaction for use of the pre-set length feature of the measuring tape.

FIG. 10 shows a method for laying out a baseball diamond relative to home plate utilizing the magnetic compass and pre-set distances of the measuring tape.

FIG. 11 shows a method of calibrating the measuring tape to a reference length.

DETAILED DESCRIPTION OF EMBODIMENTS

This disclosure provides detailed descriptions of inventive concepts and improvements which are applicable, but not limited to, a retractable measuring device such as a tape measure. Traditionally a tape measure has a leader which is positioned opposite the body of the tape measure. As the leader and tape is pulled from the body, the most pertinent information regarding the measurement remains at the body/tape interface and is unavailable to the user when they are holding the leader—especially when measuring large distances away from the body. To address this issue, the inventive concepts presented herein include control circuitry residing within the body of the tape measure that has knowledge of the current measurement, is configured to support a local and remote user interface, and has the ability to interact with a clutch or locking mechanism to restrict the ability of the tape to further deploy or retract from the tape body in response to a preset condition.

A tape measure is used through the majority of the figures for the purpose of illustrating the inventive concepts. The inventive concepts presented, however, may also be employed to other hardware which includes a retractable extension, such as a line, cord, or tape. Furthermore, the hardware and inventive concepts herein, may be utilized as a part of a larger system, such as providing information on the length of an extension ladder.

Figure 1:
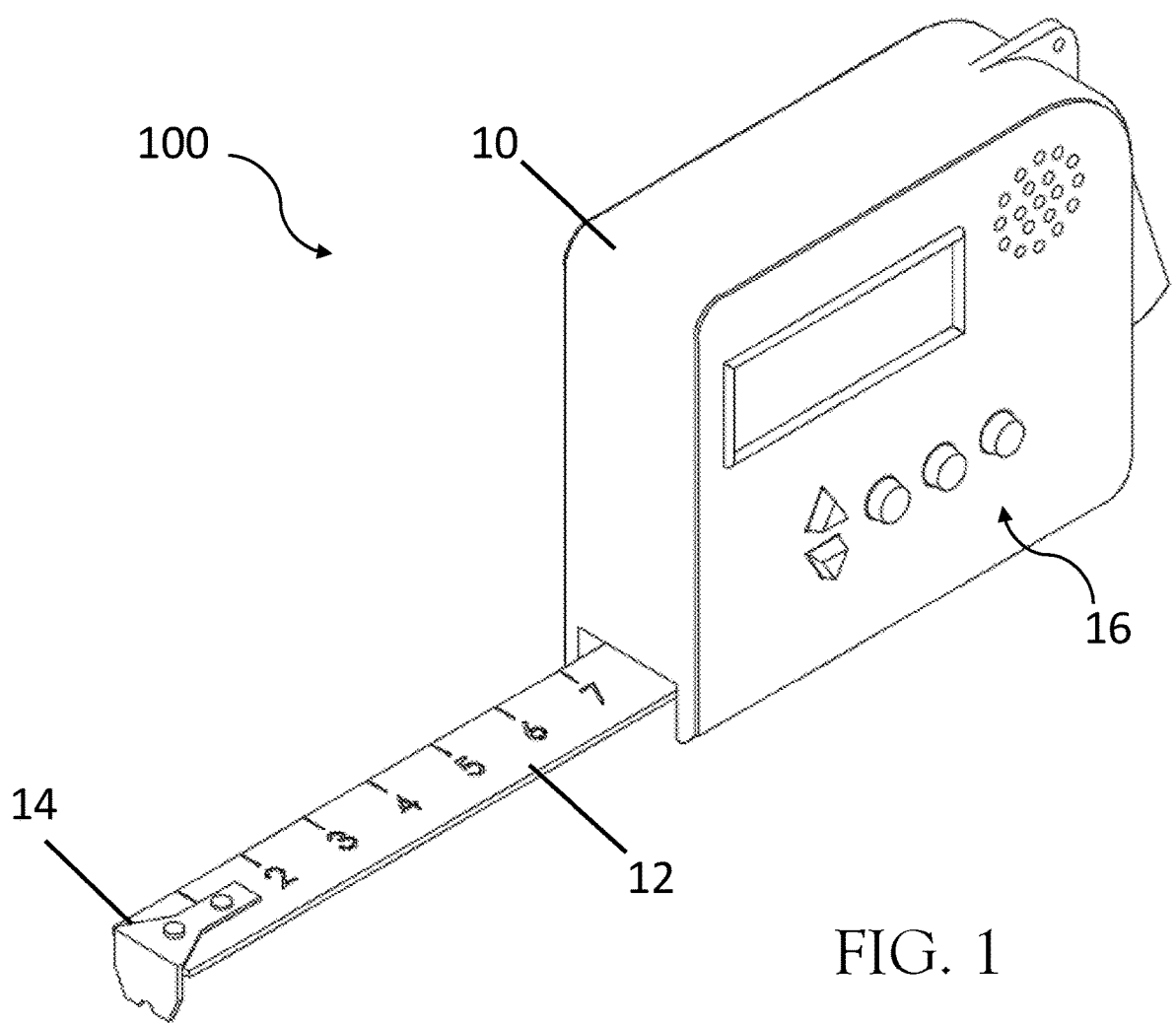
FIG. 1.

Moving to the figures, FIG. 1 shows the retractable measuring device as a tape measure 100. The tape measure includes a body 10, a section of tape 12 which is deployed from the body, and a traditional leader 14 positioned at the end of the tape opposite the body. It should be understood that the section of tape 12 shown in FIG. 1 represents a portion of a longer continuous tape that resides within the body of the tape measure; and wherein said tape is capable of being deployed and retracted from the body. A user interface 16 exists on the body 10 of the tape measure. The user interface may include any number of inputs, such as buttons, touch screens, proximity detection or touch sensors. The user interface may also include audio, visual, or tactile outputs, such as speakers, displays or illuminated devices (i.e. LEDs), or haptic motors within the body for producing vibration, respectively.

Through the described user interface, it is envisioned several user benefits can be achieved. In the most basic embodiment, the user interface may provide a digital readout of the length of tape that has been deployed. In another embodiment, the user may program (i.e., preset) a desired length of tape to be deployed via the buttons, and then cause the tape measure to provide audio and/or visual indication when the desired length has been deployed. As an extension of the previous embodiment, the tape measure may provide audio and/or visual indication in advance of reaching the desired length—thus raising awareness that the exact measurement is approaching. In yet another embodiment, in response to a preset desired length of tape being deployed, the tape measure may latch or restrict the movement of the tape traversing from the measuring tape body.

Figure 2:
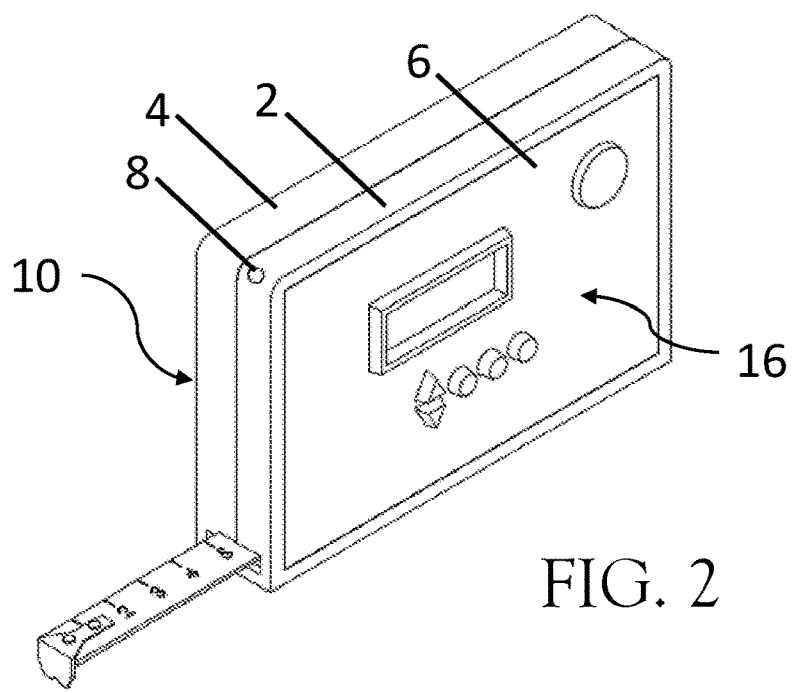
FIG. 2.
Figure 3:
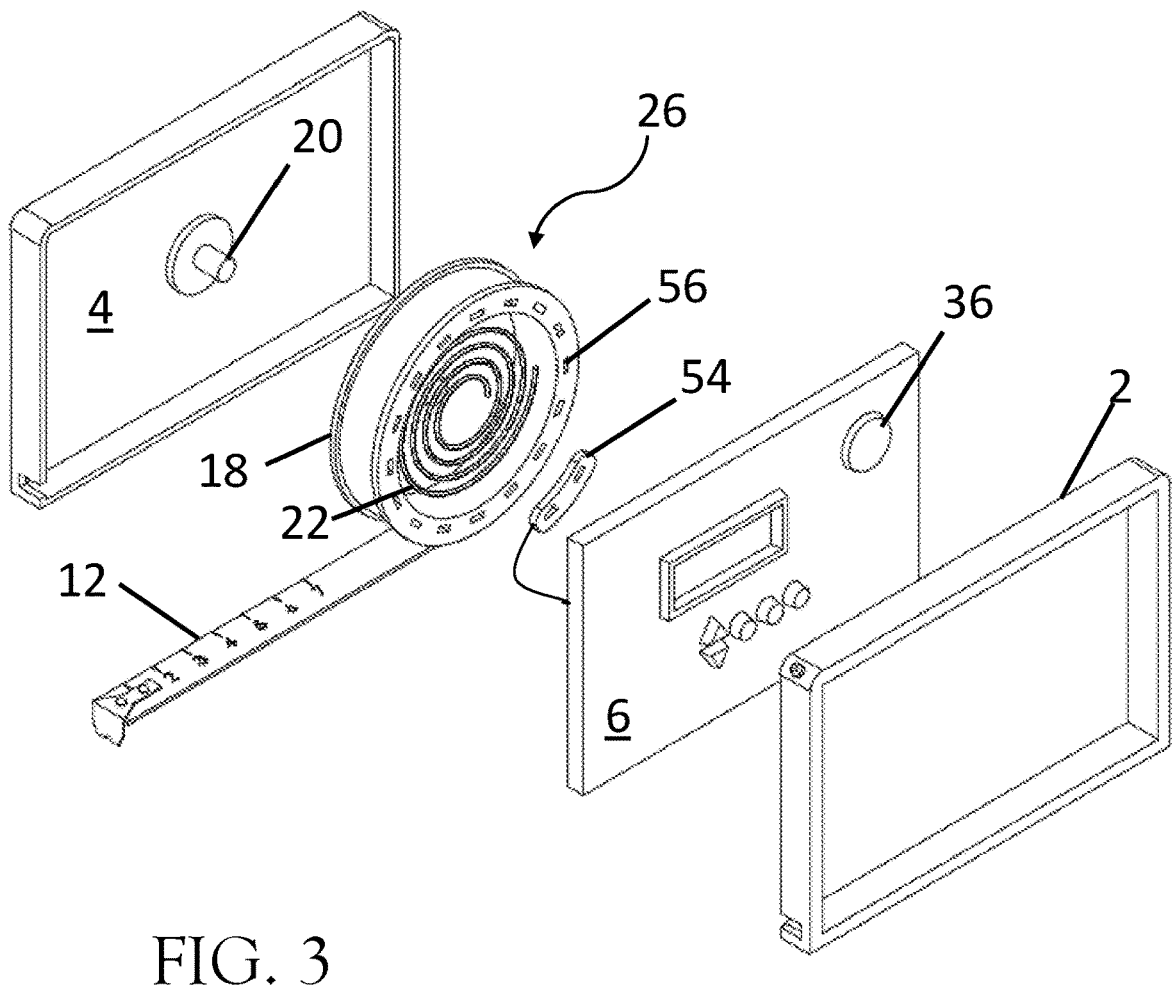
FIG. 3.

Figures FIG. 2 and FIG. 3 show a constructed and exploded view of a tape measure respectively. As shown in FIG. 2., the tape measure body 10 comprises a front housing 2 and back housing 4, and an electronic module 6. The electronic module 6 includes a processing unit or logic device, and user interface 16. In addition to the user interface 16 on the side of the unit, some embodiments may include a forward visual indicator 8, such as an LED, on the front-top of the unit in close proximity to where the tape is dispensed to provide feedback to the length of tape deployed.

FIG. 3 provides the exploded view of the tape measure thereby allowing a view of the internal tape and reel system 26. The tape and reel system includes a spool 18 upon which the trailing section of the tape 12 is wound. In one embodiment, the spool further includes rotation orientational features (such as holes, magnets, or indicia) 56 disposed around the perimeter of the spool. The rotation orientational features 56 are received by a rotational sensor to provide information on the amount the reel has spun. The number of times the reel has spun is proportional to the amount of tape that has been deployed (i.e., length of tape or leading section). The rotational sensor is connected to the electronic module 6 such that the information on the amount the reel has spun is available to the processing unit.

Additional mechanical features shown in FIG. 3 include a hub 20 which is shown on the inner wall of the back housing 4. The spool 18 rotates around the hub. In some embodiments a spring 22, which increases in tension as the tape is deployed, may be employed to aid in retracting the tape 12.

As a method of use, the user sets a desired target length via the user interface 16. As tape 12 is pulled from the body 10, the rotational sensor 54 senses the rotation orientational features 56 passing by the sensor and sends information back to the processing unit on the electronic module 6. The processing unit receives the information and computes the amount or length of tape that has been deployed. When the length of tape deployed is equivalent to the target length an audible alert sounds through the speaker 36 and a visual alert is displayed through the user interface and/or the forward visual indicator.

In some embodiments, dynamic alerts exist corresponding to the difference between the length of tape that has been deployed and the target length. An example of a dynamic alert may include tones that traverse in and out of phase. To say it another way, as the distance approaches the desired length, the speaker 36 begins emitting a periodic tone. As the distance continues to get closer, the frequency increases until a constant tone is achieved at the desired distance. As the tape then proceeds to shorten/lengthen from the target distance, the frequency decreases.

Figure 4:
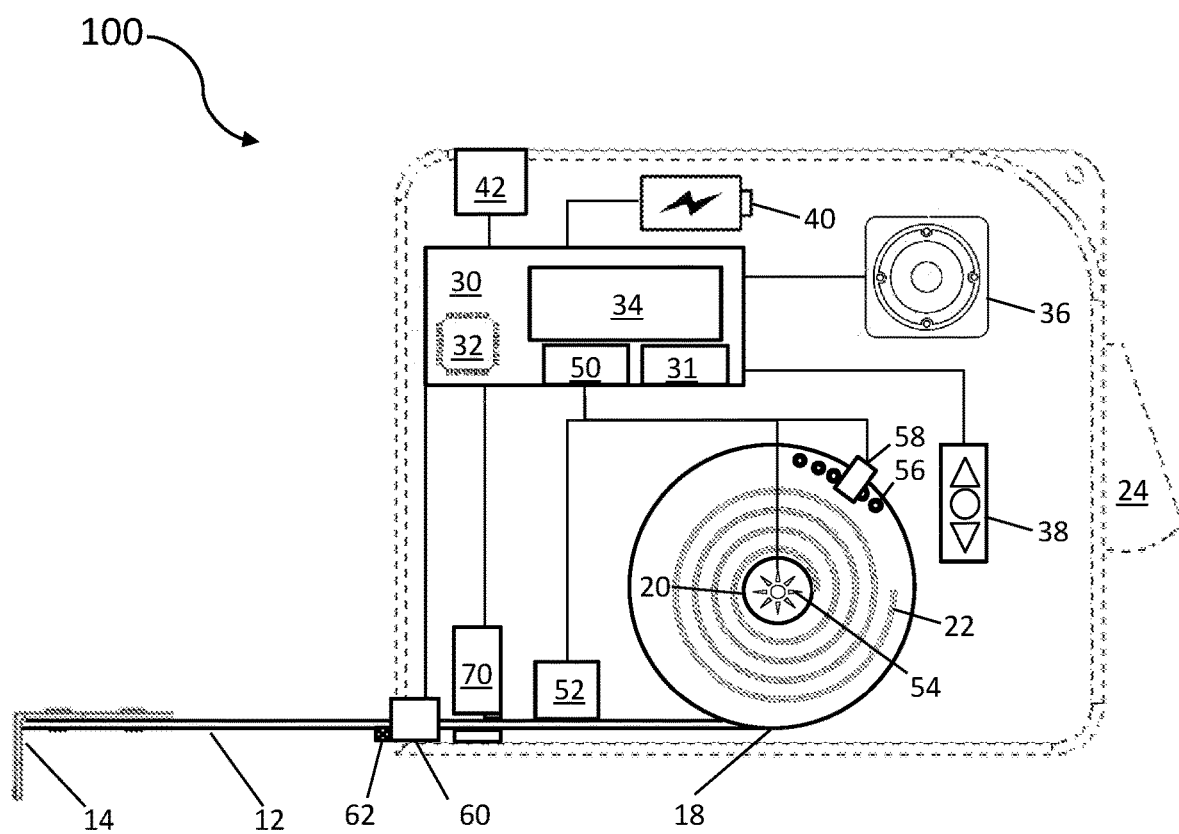
FIG. 4.

FIG. 4 shows a cut-away view of the tape measure 100 to illustrate functional blocks of internal components. FIG. 4 is not intended to show scale, but rather to show the interconnections between components either presented previously or as alternative embodiments.

Mechanical elements which are common in a retractable tape measure include the retractable tape and reel system in which a tape 12 is attached to a spool 18. The spool 18 shares an axis to a concentric hub 20 which protrudes from a fixed position in the body assembly. In some embodiment a spring 22 engages the spool 18 and the body assembly such that the spring tension increases as the tape 12 is deployed from the tape measure 100. Other embodiments may include mechanical means such as a lever or handle in communication with the spool to manually retract or wind the tape. A novel method for winding and deploying the tape may include a DC motor. A mechanical braking system including a breaking lever 24 may be present in some embodiments.

A control circuit 30 includes a logic device 32 (i.e., microprocessor, microcontroller, programmable logic device, etc.). The logic device 32 communicates with various functional blocks shown in FIG. 4. These functional blocks include the user interface previously presented and the internal electro-mechanical devices necessary to carry out the desired requirements. The user interface, as shown in FIG. 4, includes the display 34, the speaker 36, and buttons 38. The user interface may also include other visual indicators such as the forward visual indicator. As presented within this disclosure, elements of the user interface may reside on multiple faces of the body.

In some embodiments the logic device may communicate directly with or incorporate specific features including wireless communication (e.g. Bluetooth or wifi capability), GPS capability, inertial measurement unit, and/or magnetometer. In the case where these features are not integrated into the logic device, these features may be supported through an ASIC 31 or plurality of ASICs in communication with the logic device on the control circuit 30.

In embodiments configured with wireless communication capability, the logic device may communicate wirelessly (e.g. Bluetooth, wi-fi, Zigbee, etc.) with external devices, for example, a smart phone or remote user interface. The wireless communication may be bi-directional to the external device. In some embodiments, the control circuit may wirelessly broadcast information at specific intervals (similar to a Bluetooth low-energy sensor or beacon) to be received by the external device. Information broadcast wirelessly may include length of tape deployed, battery charge status, compass orientation, measurement angles relative to a fixed position, or GPS positioning information.

In embodiments configured with an inertial measurement unit (IMU) that supports axis orientation may aid in waking up the unit. Another feature that is supported by the IMU includes the ability to orient information on the user interface display such that it is easily read by the user. As an example, the text appearing on the user interface may be presented at a rotation of 0°, 90°, 180°, or 270° to present improved readability of information to the user.

In embodiments wherein the ASIC 31 includes a magnetometer, positional information including angular measurements relating to points of a compass (i.e., compass orientation relative to the earth's magnetic field) are available to the logic device 32. The benefit of the angular measurement in combination with length is presented later in the disclosure through an example where a single user is tasked with laying out a sports field.

In embodiments wherein the ASIC 31 includes a GPS chip or module, positional information is available to the logic device 32. While for some application this positional information may be too coarse relative to measurement requirements, it may be used for logging or evidence purposes. In other applications, and given the improvements in accuracy through technological advance, the GPS positional information may supplement the accuracy of the tape measurement.

The control circuit 30 is powered by a battery 40. In one embodiment the battery may be replaceable by the user (i.e., removable AA, AAA, coin cell, etc.). In other embodiments, the battery 40 may be rechargeable via a connector port 42 (i.e., USB or another type of connector) configured to receive a mating plug capable of providing sufficient power to charge the battery. In the case of a rechargeable battery, the control circuit 30 may also include circuitry to enable communication with the logic device for monitoring and regulating the recharging event—in other words, the logic device has knowledge of the battery charge.

A key requirement of the present invention is that the logic device is aware of how much of the tape has been deployed. To say it another way, the logic device must know the measurement of the tape. Various sensors may be employed to accomplish this task. The control circuit 30 is shown as having sensor receiving circuitry 50 which is in communication with the logic device 32. Non-limiting examples of sensor receiving circuitry 50 include analog-to-digital convertors, current or voltage measurement circuitry, encoder circuitry, circuitry to support hall-effect sensors, or circuitry to send and receive optical encoder signals.

Two configurations are shown in FIG. 4 which enable measurement of, and thereby computing by the logic device, the length of tape deployed from the body of the tape measure. The first configuration of measurement includes measuring the rotation of the spool 18 in relation to the hub 20 or body. The second configuration of measurement includes a linear measurement of the tape moving or traversing across a sensor (herein linear sensor 52) as it is being deployed or retracted.

In the rotational measurement configuration, one type of sensor (herein referred to as the rotational sensor 54) which supports rotational measurement would be an encoder. An alternate embodiment for rotational measurement may utilize the spool 18 itself to act as the disk of the encoder. In this alternate embodiment, the sensor may comprise a series of holes, magnets, or visual indica as rotation orientational features 56 on the spool. In such an embodiment a corresponding sensor such may serve as the rotational sensor 58 such as an optical sensor 58 for holes or visual indica or hall effect sensor 58 for magnets.

In the linear measurement configuration, a linear sensor 52 may interact directly with the tape as it traverses across the sensor. One embodiment for the linear sensor may comprise a wheel or gear which is in communication with the surface of the tape, whereby the length of the tape may be computed by the logic device 32 as being in proportion to the number of turns of the wheel or gear. In an alternate embodiment, the linear sensor 52 may be a reflective optical sensor configured to detect either indicators or markings on the surface of the tape. In yet another embodiment, the linear sensor 52 may be an optical sensor which detects light passing through indicator holes in the tape.

In order to calibrate either the linear or rotational measurements, the logic device must know a zero-reference point. In one embodiment, this may be accomplished through the inputs of the user interface, such as a power button, a zero button, a specific sequence such as holding a button down for a preset amount of time, or detection of activity from the linear or rotational sensors (52 and 54). In an alternate embodiment, the zero-reference may be established by a zero-reference sensor 60 as shown in FIG. 4. The zero-reference sensor is in communication with the logic device 32. The zero-reference sensor may be a momentary switch with a button 62 that transitions states when in contact with the leader 14 (e.g., the state of the switch changes when the leader of the tape comes in contact or departs from the body of the tape measure). Alternatively, the zero-reference sensor may be an optical sensor which interacts with a unique arrangement on the tape (such as a hole).

Utilizing a combination of the aforementioned sensors, the computation of the length of tape 12 which has been deployed from the body may be computed by the logic device. Initially, the zero reference is established either by a reset through the user interface or by a state change of the zero-reference sensor 60. Using a rotational sensor 54, the length of tape deployed is equivalent to the spiral circumference of the tape on the spool multiplied by the number of rotations. The term spiral circumference is used specifically in this application to account for the circumference and diameter of the tape increasing with every wind around the spool. Likewise, it should be understood that the circumference and diameter of the tape wrapped around the spool decreases as the length of deployed tape increases. Using the linear sensor 52 and indicators on the tape, the length of the tape deployed is equivalent to the linear length between indicators multiplied by the number of indicators read. Using a wheeled or geared linear sensor 52 in contact with the tape, the length is equivalent to the rotations of the wheel or gear multiplied by the circumference of the wheel or gear.

In FIG. 4, a final element is an electronic braking mechanism 70. The purpose of the electronic braking mechanism is to restrict movement or hold the tape so that it may not traverse across. An example of the electronic braking mechanism 70 may include a solenoid with a plunger or an electrically actuated clutch plate which presses against the tape. Another example of the electronic braking mechanism 70 may include a motor control which drives a latching mechanism. Yet another example may include actuation of an electro-magnetic coil which secures either the metallic tape or a ferrous material (i.e., permanent magnet or metal bar) positioned opposite the coil thereby pinching a non-metallic tape.

The electronic breaking mechanism may alternatively be embodied as a motor connected to the spool by a motor shaft. The motor may be a DC brush motor where the spool is held in position by providing either a series of alternating polarities from the control board to essentially lock the spool from rotating forward or backward. In another embodiment, the DC brush motor may be driven in just one direction to retract the tape if the user extends past the preset target length. In another embodiment, a step motor may be used to lock the spool between poles (i.e., holding torque).

Figure 5:
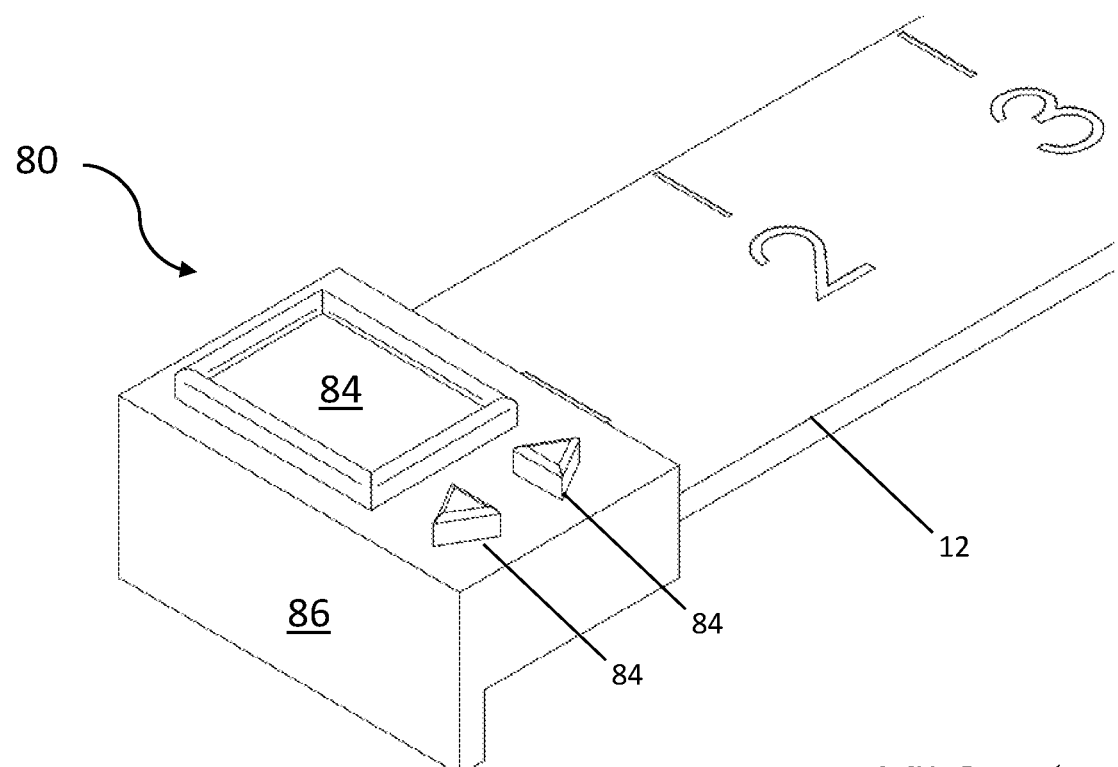
FIG. 5.

As shown in FIG. 5, an independent or complementary configuration is to have a display or remote user interface on the leading tip of the tape. As an example of functionality this display can communicate with the body (e.g., Bluetooth) and display the current measurement data. Also included in the remote user interface 80 are UI buttons 84 for remote distance setting from the leading tip. FIG. 5 illustrates the remote user interface 80 positioned at the end of the tape 12 opposite the body.

The remote user interface 80 provides the same functionality of the traditional leader (i.e., prevents the tape from being retracted into the body and provides a leading edge 86 for the measurement). The remote user interface adds further functionality by providing the user information regarding the current measurement on the secondary display 84. The remote user interface may comprise identical elements as the previously presented user interface. As shown, the user interface may include a secondary display 82 and secondary button inputs 84. Alternatively, the user interface may include a single or plurality of LEDs as a visual indicator in lieu of the display. In the primary embodiment, communication between the control circuit and the remote user interface 80 is achieved via a wireless link.

Figure 6A:
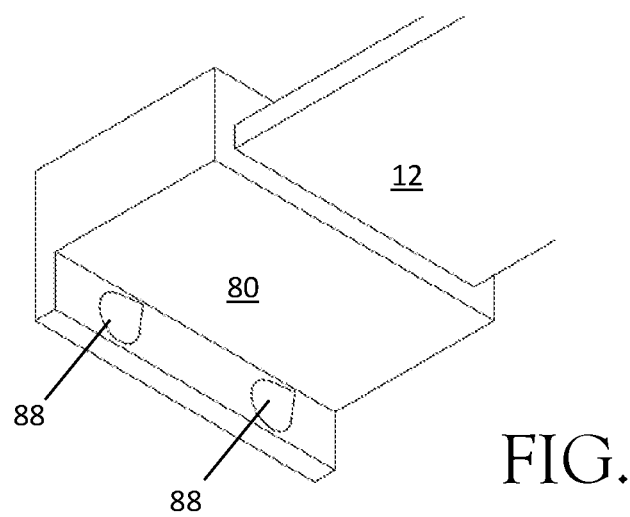
FIG. 6A/6B.
Figure 6B:
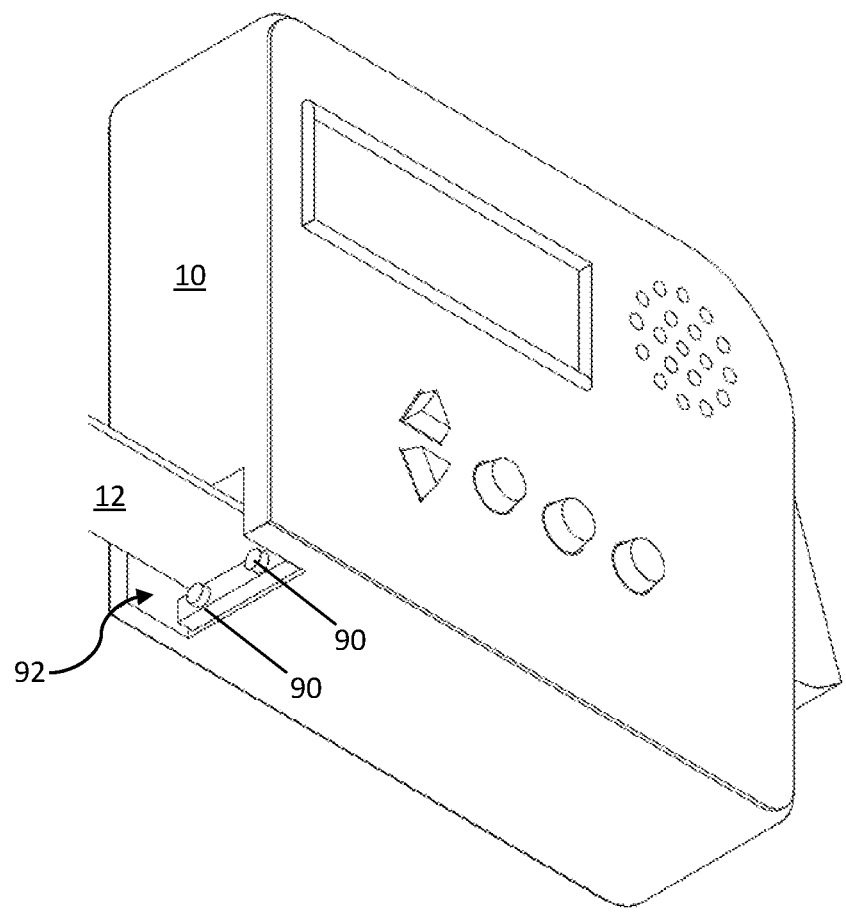

FIG. 6A shows a bottom isometric view of the remote user interface 80, the body 10 of the tape measure configured to receive the remote user interface, and the tape 12; similar elements are shown in FIG. 6B. A secondary battery exists to power the remote user interface. As the primary battery exists in the body of the tape measure FIGS. 6A and 6B illustrate an arrangement to charge the secondary battery from the primary battery. As shown, the remote user interface 80 includes a pair of charging tabs 88 (e.g. power and ground) which provide the differential voltage necessary to charge the secondary battery. The power tabs 88 engage a pair of charging buttons 90 which are mounted on the body of the tape measure. The charging buttons 90 are connected to the primary battery inside the body of the tape measure. FIGS. 6B shows remote user interface receiving dock 92 which is configured to receive the remote user interface 80.

Figure 7:
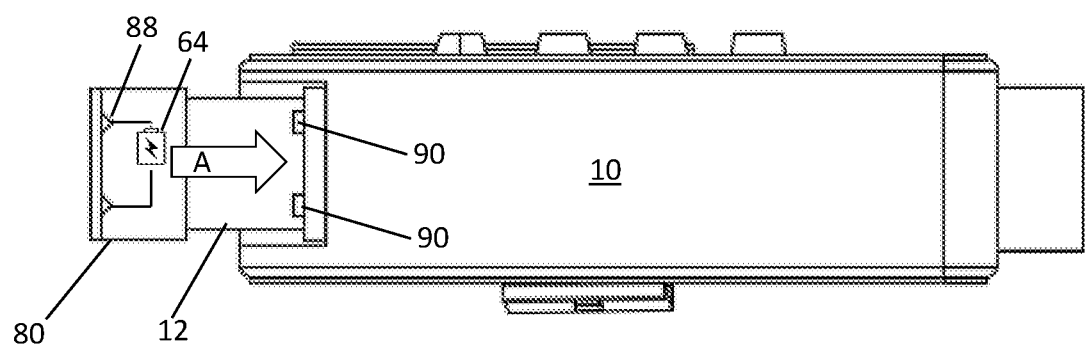
FIG. 7.

FIG. 7 provides a bottom view of the charging arrangement and the secondary battery 64 residing inside the remote user interface 80. As indicated by arrow A, charging is enabled when the remote user interface 80 is docked in the body 10 of the tape measure and the charging tabs 88 contact the charging buttons 90. Control circuitry may exist within the body of the tape measure to allow the logic device to further enable or disable charging of the remote user interface.

Figure 8A:
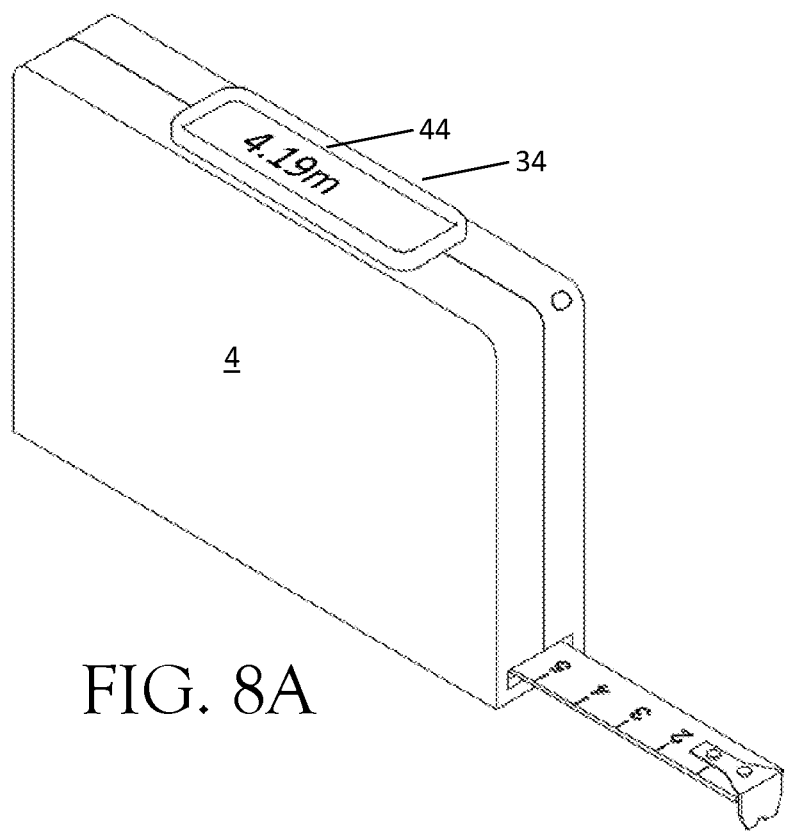
FIG. 8A/8B.
Figure 8B:
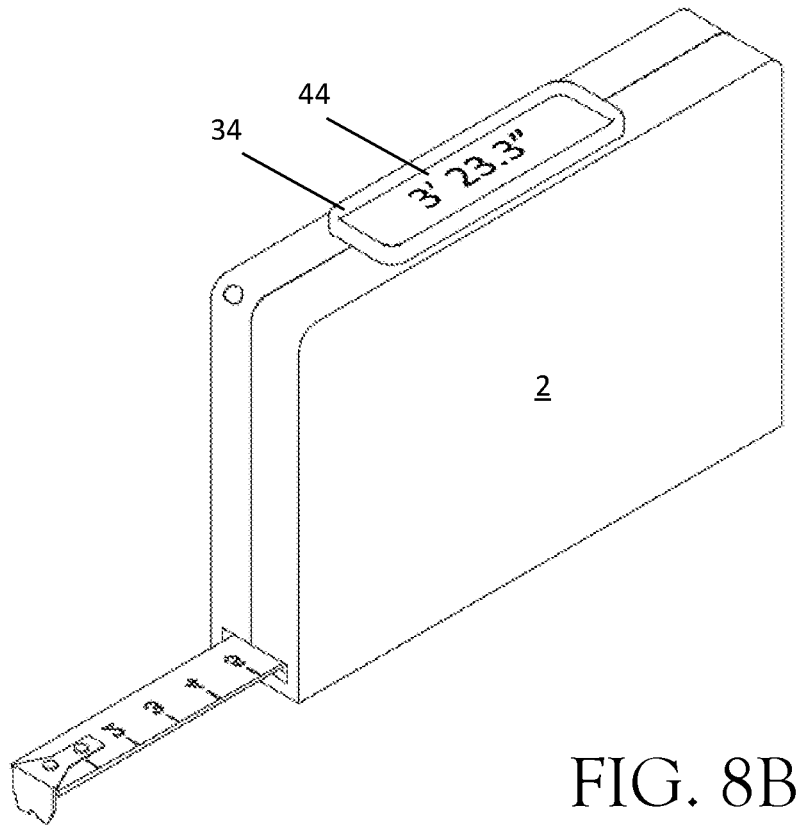

FIG. 8A and 8B illustrate the ability for the display 34 to orient towards a right-hand or left-hand read out. For the purpose of orienting information on the display, the display is purposefully shown on the top of the unit. Specifically to the drawing, FIG. 8A is shown as being in left-hand orientation with readout being preferably readable from the back housing 4 facing the user; FIG. 8B is shown as being in right-hand orientation with the readout 44 being preferably readable from the front housing 2 facing the user. The orientation may be set through a user interface or in response to the orientation detected through the IMU. Also FIG. 8A and 8B illustrate the ability for the tape measure display to switch between imperial unit mode and metric unit mode.

Figure 9:
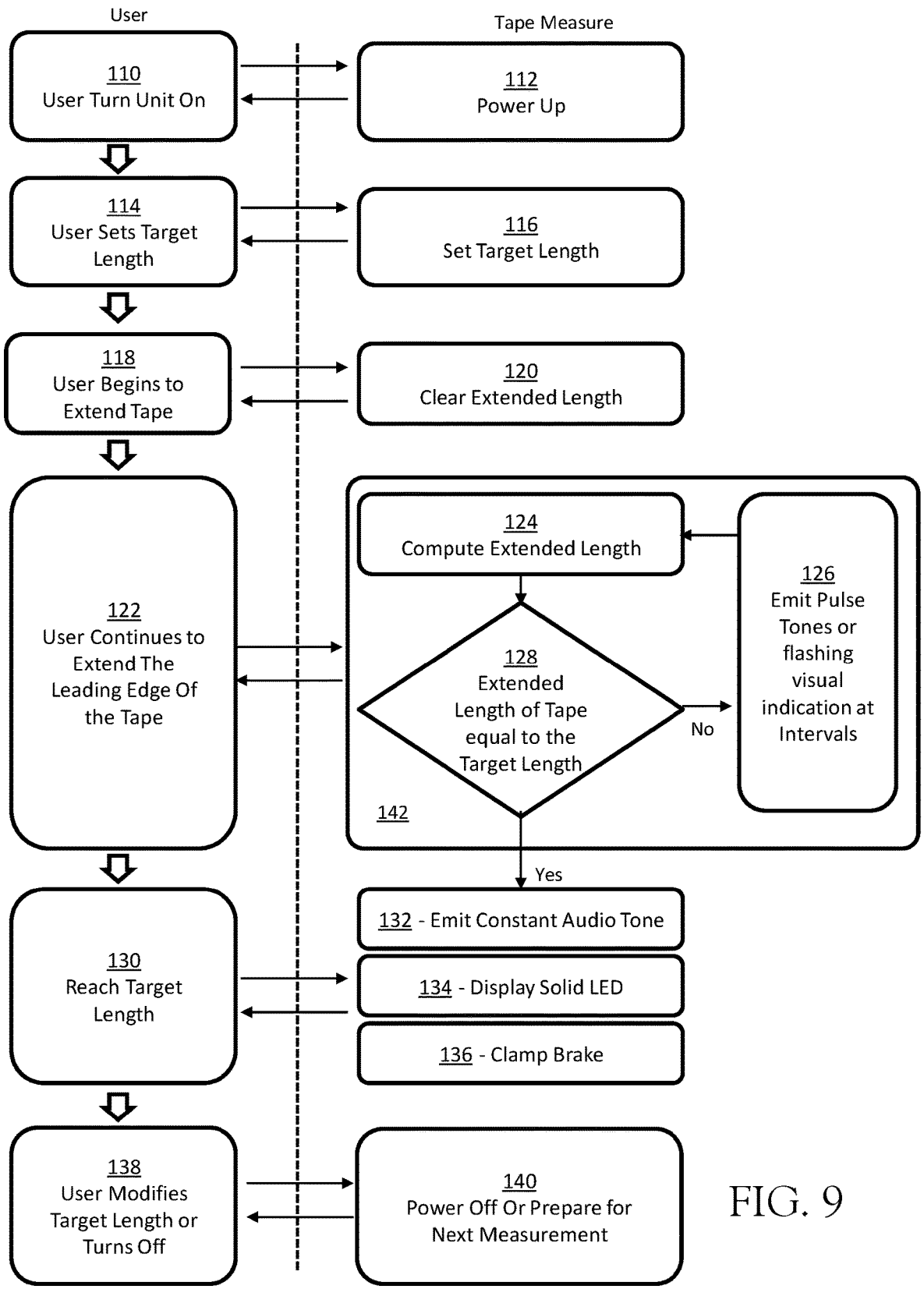
FIG. 9.

FIG. 9 shows a flow chart of the man-machine interaction when using the tape measure. User steps are presented on the left side of the figure and the machine or Tape Measure steps are presented on the right side. Steps are individually numbered and bi-directionally arrows crossing the dotted line indicate the machine response. It should be understood this is a non-limiting example as alternative embodiments for similar operations have been presented herein. Reference to the user interface for this figure may include the user interface on the body of the tape measure, the remote user interface positioned at the distal end of the tape opposite the body, a forward visual indicator, or a wirelessly connected UI existing on an external device.

Initially, at block 110, the user powers on the device. The tape measure responds by powering up in block 112. At block 114, the user enters a target length through a user interface. The tape measure responds by storing the target length in memory of the logic device at block 116. At block 118 the user begin extending the tape by positioning the tape body at a fixed position and pulling on the leader. If the device has not been zeroed by other means, the extended length measurement is cleared at block 120 in response to the tape being extracted.

As the user continues to extend the leading edge of the tape at block 122, the tape measure enters a decision loop 142. Within the decision loop, the tape measure continually computes the extend length by using the linear or rotational sensors at block 124. The computed extended length is compared to the target length at block 128. If the computed extended length is equal to the target length, the tape measure exits the decision loop 142. If the computed length is not equal to the target length, the tape measure may respond by emitting alerts such as tones or flashing visual indicators as specified intervals at block 126 and continues to block 124 to compute the extended length.

As the user continues to extend the tape to a point where the user has reached the target length, block 130, the tape measure may take any combination of actions. One action, block 132, is for the tape measure to emit a constant audio tone or a single audio event such as a chime. Another action, block 134, is for the forward visual indicator or display to turn solid or present some other visual indica that the target measurement has been reached. In embodiments including an electromechanical brake (e.g., clamp, latch, motor, etc.). the brake may be activated as shown in block 136.

In block 138, the user may choose a variety of next steps including powering the unit off, modifying the target length, or interacting with a user interface to release the brake. The tape measure responds appropriately by either powering off or releasing the brake to prepare for the next measurement as indicated by block 140.

Figure 10:
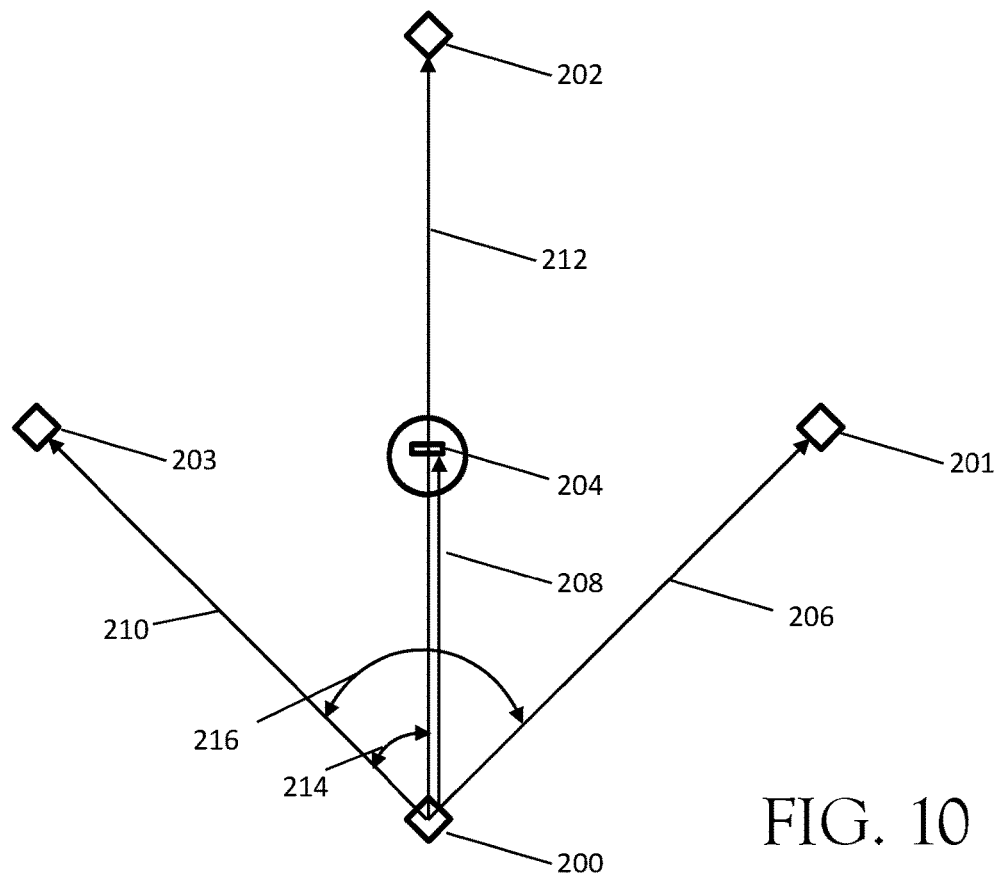
FIG. 10.

FIG. 10 illustrates a non-limiting method of use where a user is required to layout a baseball diamond without assistance. In the preferred embodiment, the user will utilize the distance and compass angular measurements provided by the magnetometer. The initial position for home plate 200 is chosen and the body of the tape measure is secured such that the location is fixed at home plate, but the base of the body is able to rotate along a longitudinal axis. To identify the location of first base 201, the user preset a target length of 90 feet, establishes the initial rotation around the longitudinal axis as zero, and extends the tape in a linear direction along path 206. When the computed length equals the extended length, the tape measure provides an alert, sets a brake or latch, and the position of first base is established.

To establish third base 203, the user may then walk with the tape still extended to 90 feet until the user interface identifies the rotational information (angle heading 216) as being 90° (i.e., the angle between vector 206 and 210). The user may change the target length to 60'6" causing the brake to momentarily release and allowing the tape to retract to 60'6". Once the tape has retracted to the new set target length, the user may transition to the point where the rotational information is an angle heading 214 of 45° (vector 208) to establish the pitcher mound 204. To establish second base 202, the user once again changes the preset value to 127 feet and continues along path 212 while maintaining an angular heading of 45° until the target length equals the extend length.

Figure 11:
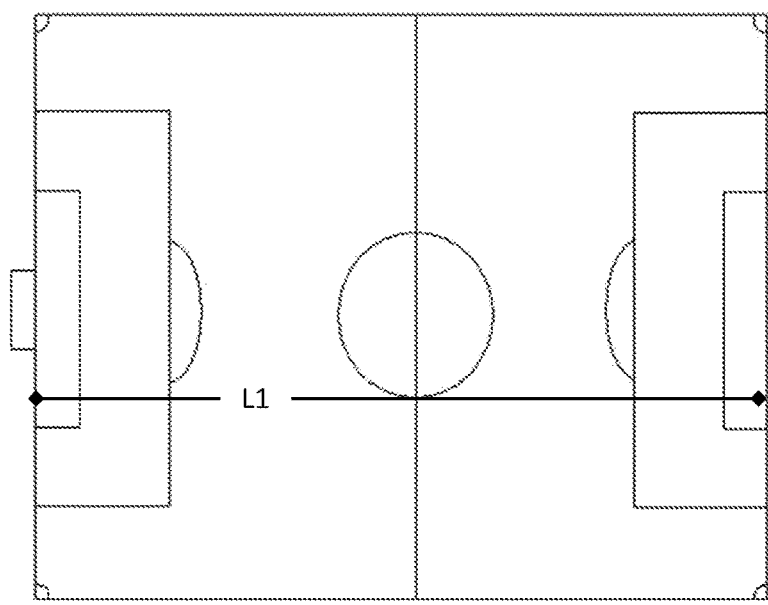
FIG. 11.

FIG. 11 provides an example for recalibration of the tape measure. While variation of the steel tape of a tape measure is uncommon due to wear and tear, it may be present in other measurement and marking devices such as nylon fabric tapes or the string of a chalk line. In this example an established distance is known in advance and marked by a fixture, such as the distance between cross field soccer goal posts. Before marking or measuring any additional features, the user may first extend the tape or chalk line between posts of opposing soccer goals as indicated by L1. For this example, the distance is known in advance to be 90 meters. The user may then enter calibration mode and enter the distance into the unit via the user interface. The logic device is then able to interpolate and thereby recalibrate to account for any stretch or other non-conforming properties of the tape.

What is claimed is:

1. A retractable measuring device comprising
a body and tape;
wherein the tape is configured to extend and retract from an opening in the body of the measuring device, said tape includes a leading section of tape external to the body and a trailing section of tape wound internally within the body;
wherein an electronic module resides within the body and includes a sensor, logic device, and circuitry supporting wireless transmission;
wherein said sensor provides an electrical signal corresponding to the length of tape that has been extended to the logic device; and wherein the logic device receives the electrical signal, computes the length of tape that has been extended from the body, and broadcasts information corresponding to the length of tape that has been extended via a wireless transmission;
wherein a remote interface exists where the leading section of tape terminates opposite the body of the measuring device, said remote interface having a display and a wireless receiver capable of receiving information corresponding to the length of tape that has been extended from the body, and showing said information on the display.

2. The retractable measuring device of claim 1 wherein the sensor is a linear sensor in communication with the tape and positioned near the opening of the body.

3. The retractable measuring device of claim 1 wherein the trailing section of tape is concentrically wound around a spool, and wherein the sensor is a rotational sensor fixed on to the body of the measuring device and in communication with the spool.

4. The retractable measuring device of claim 1 wherein the remote interface further comprises a plurality of buttons, and wherein the buttons enable the user to set a target length for the length of the leading section.

5. The retractable measuring device of claim 4 wherein a brake mechanism resides within the body of the tape and restricts the ability of the tape to extend when the length of the leading section corresponds to the target length.

6. The retractable measuring device of claim 4 wherein the body includes a speaker which sounds an audible tone via a pattern, and wherein said pattern changes based on the delta between the length of the leading section and the target length.

7. The retractable measuring device of claim 1 wherein the body of the measuring device includes a power source internal to the body and a first pair of electrical connectors residing on the exterior surface of the body along the opening, the remote user interface includes a power storage device internal to the remote interface and a second pair of electrical connectors residing on the exterior surface of the remote interface, and wherein the first pair of electrical connectors and second pair of electrical connectors are in communication when the tape is fully retracted to facilitate a charging connection from the power source to the power storage device.

8. The retractable measuring device of claim 1 wherein the tape is fabricated as a string.

9. The retractable measuring device of claim 1 wherein a magnetometer resides within the body of the measuring device, and wherein the broadcasted information further comprises the compass orientation of the leading section of tape.

10. A retractable measuring device comprising
a body, a tape which can retract and extend from an opening in the body, and a remote user interface positioned at the end of the tape opposite the body;
wherein the tape, when extended from the body, has a length;
wherein said remote user interface provides information relating to the length.

11. The retractable measuring device of claim 10 wherein a logic device within the body broadcasts the length to the remote user interface by a wireless link.

12. The retractable measuring device of claim 10 wherein the body of the measuring device includes a power source internal to the body and coupled to a first pair of electrical connectors located on an external surface of the body, the remote user interface includes a power storage device residing inside the remote user interface and a second pair of electrical connectors located on the external surface of the remote user interface, and wherein the first pair of electrical connectors and second pair of electrical connectors are in communication when the tape is fully retracted to facilitate a charging connection from the power source to the power storage device.

* * * * *